Dec. 30, 1969   J. G. CADIOU   3,486,203
SAFETY BELTS FOR THE PASSENGERS OF VEHICLES
Filed Dec. 12, 1966   4 Sheets-Sheet 1

INVENTOR
JEAN GEORGES CADIOU

BY *Woodcroth, Lind & Ponack*
ATTORNEYS

Dec. 30, 1969  J. G. CADIOU  3,486,203
SAFETY BELTS FOR THE PASSENGERS OF VEHICLES
Filed Dec. 12, 1966  4 Sheets-Sheet 2
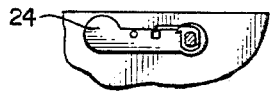
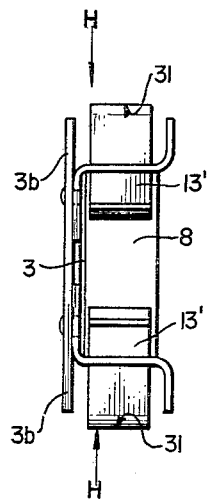
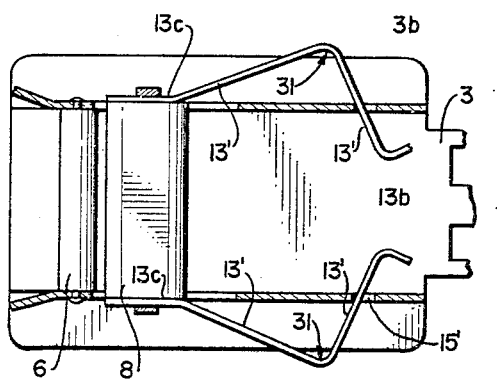
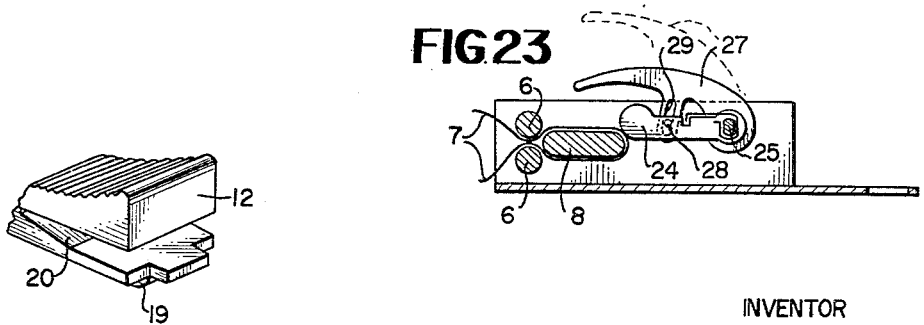
INVENTOR
JEAN GEORGES CADIOU
BY *Wenderoth, Lind & Ponack*
ATTORNEYS Dec. 30, 1969    J. G. CADIOU    3,486,203
SAFETY BELTS FOR THE PASSENGERS OF VEHICLES
Filed Dec. 12, 1966    4 Sheets-Sheet 3

INVENTOR
JEAN GEORGES CADIOU

BY *Wendsroth, Rind & Ponack*
ATTORNEYS

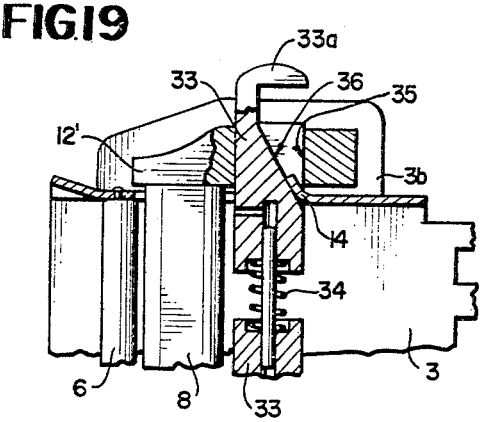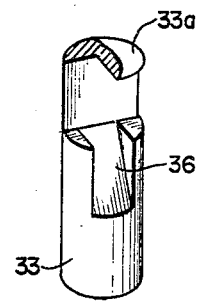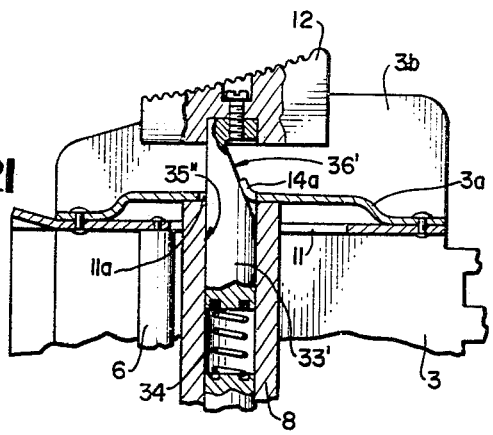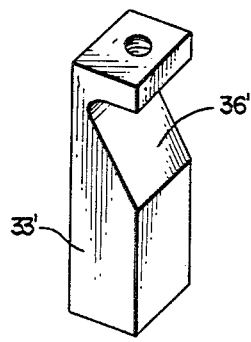
INVENTOR
JEAN GEORGES CADIOU

United States Patent Office
3,486,203
Patented Dec. 30, 1969

3,486,203
SAFETY BELTS FOR THE PASSENGERS
OF VEHICLES
Jean Georges Cadiou, Paris, France, assignor to Societe Anonyme Andre Citroen, Paris, France, a French corporation
Filed Dec. 12, 1966, Ser. No. 601,028
Claims priority, application France, Dec. 17, 1965, 42,821
Int. Cl. A44b 11/10
U.S. Cl. 24—196                 12 Claims

ABSTRACT OF THE DISCLOSURE

This invention relates to a device for adjusting the length of a safety belt for vehicle passengers, of the type utilizing a belt webbing, a buckle frame adapted to be connected to a buckle member fixed inside the vehicle and incorporating a sliding-pin, said frame comprising, on one side of the aforesaid pin, a slot permitting the passage of two plies of the webbing which passes around the sliding pin, the two plies issuing from the pin passing through the slot such that the tightening of the belt produces wedging of the double ply of webbing between said pin and each edge of said slot. The present invention provides a device characterized essentially in that the sliding pin of the buckle frame is constantly urged by means of adequate resilient members against each edge of the passage slot, the tightening belt being therefore doubly wedged between the sliding pin and the edegs of said slot, even if the belt is not tensioned.

---

This invention relates to a device for adjusting the length of a safety belt for vehicle passengers, of the type utilizing a belt webbing, a buckle frame adapted to be connected to a buckle member fixed inside the vehicle and incorporating a sliding-pin, said frame comprising, on one side of the aforesaid pin, a slot permitting the passage of two plies of the webbing which passes around the sliding pin, the two plies issuing from the pin passing through the slot such that the tightening of the belt produces wedging of the double ply of webbing between said pin and each edge of said slot.

However, when the belt is not tensioned and the above-defined device is subjected to jolts or vibrations caused by the operation of the vehicle, the sliding pin is frequently slackened, thus causing a misadjustment of the belt length, and if some retaining means is not provided at the free end of the belt the latter may even escape completely from the buckle frame.

It is the essential object of the present invention to avoid this drawback.

To this end, the present invention provides a device characterised essentially in that the sliding pin of the buckle frame is constantly urged by means of adequate members against each edge of the passage slot, the tightening belt being therefore doubly wedged between the cross bar and the edges of said slot, even if the belt is not tensioned.

Other features and advantages of this invention will appear as the following description proceeds with reference to the accompanying drawings illustrating diagrammatically by way of example several possible forms of embodiment of the present invention. In the drawings:

FIGURE 8 is a partial perspective view illustrating the modification of FIGURE 7.

FIGURE 16 is a side view of a detail illustrating a further modification.

FIGURE 17 is a horizontal cross-sectional view showing a modified construction.

FIGURE 18 is a side view of the construction shown in FIGURE 17.

FIGURE 19 is a partial cross-sectional view illustrating a further modification.

FIGURE 20 is a perspective view with parts broken away illustrating an element of the modification shown in FIGURE 19.

FIGURE 21 is a partial cross-sectional view illustrating a further modification, and FIGURE 22 is a perspective view of the bolt used in the modification of FIGURE 21.

FIGURE 23 illustrates a modification of the structure shown in FIGURE 15.

Figure 1:
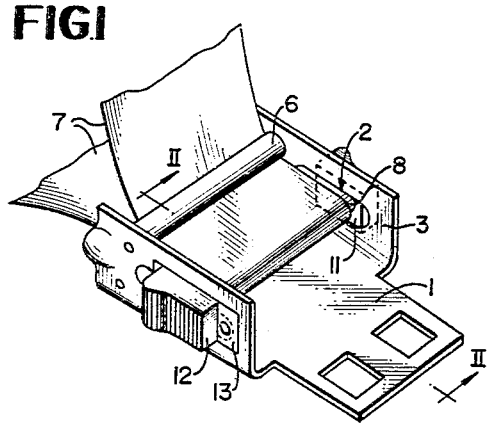
FIGURE 1 is a perspective view of one form of the invention.

Referring first to FIGURE 1 of the drawing, it will be seen that the device 1 comprises a mounting 3 having side walls in which elongated apertures 11 are formed, and a pair of parallel cross rods 6 rigidly secured thereto between said side walls. Thus, a slot is formed between said rods 6, of which they constitute the parallel edges and this slot is engageable by the two sections of a tightening belt 7. Slidably mounted in, and guided at either ends by the upper and lower edges 2 of said apertures 11 is a tightening pin 8 (FIGURES 1, 2, 3 and 4) carrying at its ends control means in the form of a pair of opposite gripping knobs 12, the lateral surface of this pin, which is to be engaged by the tightening belt 7 having a certain roughness obtained for example by foming a chequered pattern thereon, or by knurling or milling (see FIGURE 3).

Figure 2:
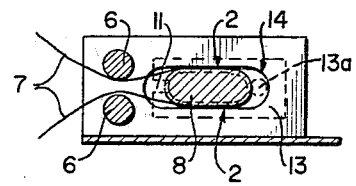
FIGURE 2 is a cross-sectional view taken upon section line II—II of FIGURE 1.
Figure 3:
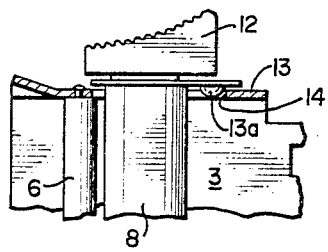
FIGURE 3 is a plan view partly in section of a detail of the construction shown in FIGURE 1.
Figure 5:
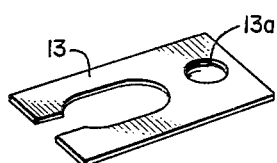
FIGURE 5 is a perspective view showing one element of the invention.
Figure 9:
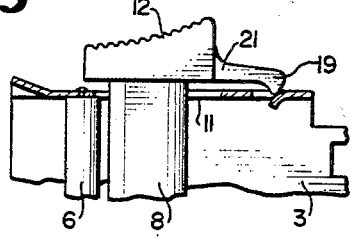
FIGURE 9 is a similar view showing a further modification.

According to this invention, the tightening pin 8 is provided for example at either ends with a return member consisting of a flat spring 13 (FIGURE 5). This spring is notched and surrounds the pin 8 under the corresponding gripping knob 12 and has a projection 13a formed therein which is adapted to co-act with a lateral edge 14 of the relevant aperture 11 (FIGURE 2).

Figure 4:
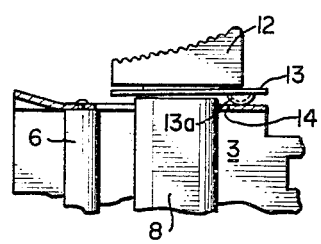
FIGURE 4 is a similar view showing the operating parts in a different position.

In fact, if the pin 8 is moved towards the rods 6 the external face of boss 13a contacting the lateral edge 14 will push the pin 8 towards the rods 6, thus causing the strap 7 to be doubly wedged, even if the belt is not tensioned. If on the other hand the pin 8 is pushed towards the lateral edge 14 of aperture 11 the aforesaid projection 13a rises on the wall of mounting 3, thus releasing the belt 7 (FIGURE 4).

Figure 6:
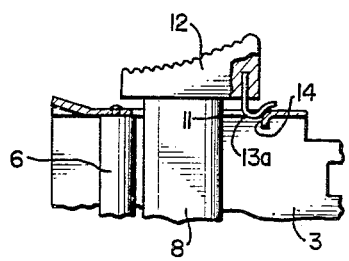
FIGURE 6 is a partial view showing a modified construction.

FIGURE 6 shows an alternate form of embodiment of the device shown in FIGURE 1; the spring means 13 may consist of a flat spring secured either to the pin 8 and formed in this case with a projection 13a, as shown in FIGURE 6.

Figure 7:
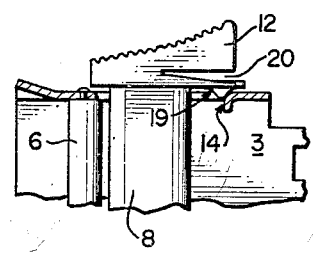
FIGURE 7 is a similar view showing a modification.

FIGURES 7 and 8 show a sliding pin provided with an integral tooth 19. When this tooth 19 engages the aperture 11 it exerts a pressure against one of the side edges 14 thereof, thus urging the tightening pin against the rods 6. It will be noted that a notch 20 imparts a certain elasticity to the tooth 19.

FIGURES 9, 11, 12, 13 and 14 illustrate other modified forms of embodiment of the device of FIGURE 7. The tooth 19 is formed at the end of an arm 21 having a certain elasticity due to its length (see FIGURES 9, 11 and 12) and is adapted to engage either the edge of an aperture 15 formed in the mounting 3 (see FIGURE 11) or a projection 16 formed on this mounting (see FIGURE 12); the assembly comprising the pin 8, arm 21 and tooth 19 is preferably a one-piece element.

Figure 13:
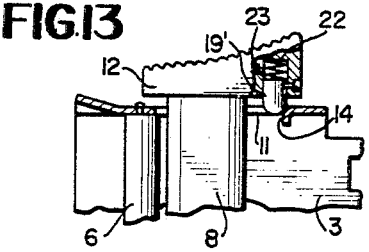
FIGURE 13 is a similar view indicating a further modification.
Figure 14:
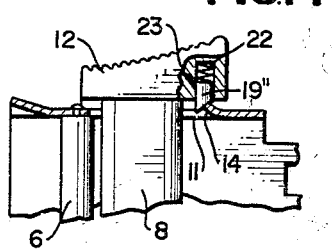
FIGURE 14 is a similar view indicating a further modification.

In FIGURES 13 and 14, as contrasted with the preceding form of embodiment, the tooth 19' or 19" urged by spring 22 is adapted to slide in a recess 23 formed in the gripping knob 12, the free end of this tooth coacting with one of the side edges 14 of aperture 11 which is either lowered (FIGURE 13) or raised (FIGURE 14) to this end.

Figure 15:
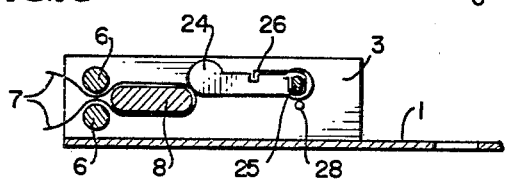
FIGURE 15 is a cross-sectional view indicating a modified construction.

FIGURE 15 illustrates a return member comprising a cam 27 fulcrumed on a pivot pin 25 and urged by a spring 26 secured to this pin against the pin 8 so as to push this pin towards the parallel rods 6, thus locking or wedging the belt 7 even if the latter is not tensioned.

It will be noted that this cam 24 may be mounted on the pivot pin of a control member consisting for example of a lever 27 for opening the device 1, a stud 28 secured to this lever or to said cam 24 (and coacting in this case with an elongated aperture 29 formed in said lever, FIGURE 16, permitting, during the release of the device 1, according to this invention, of raising the cam 24 and thus releasing the tightening belt 7 for adjusting the latter at the desired length.

Figure 10:
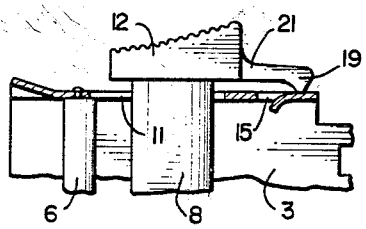
FIGURE 10 is a similar view illustrating a further modification.
Figure 11:
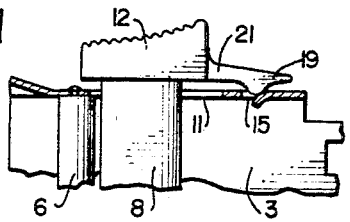
FIGURE 11 is a similar view indicating a further modification.
Figure 12:
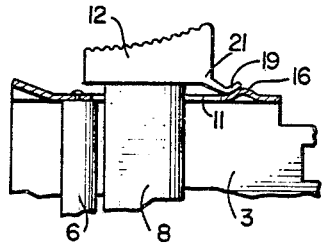
FIGURE 12 is a similar view illustrating a still further modification.

Similarly, the belt 7 may be released, in the devices illustrated in FIGURES 7 and 8, 9 and 10, 11, 12, 13, 14 and 15, by pushing the pin 8 in order to cause the tooth 19 to rise on the mounting 3 (FIGURE 10).

On the other hand, in some of the devices illustrated, the user must keep with one hand, for example, the pin 8 away from the parallel rods 6, before he can adjust the length of the belt 7.

It is convenient to have the possibility of releasing the buckle by a mere finger-pressure, without causing the pin 8 to slide with the hand in the apertures 11 (FIGURES 1 and 2).

In FIGURES 17 and 18 for instance, the spring 13 is provided with a loop 31 constituting a control element intermediate its ends, these ends being secured as at 13b and 13c to the mounting 3 and to the pin 8, or engaged in an aperture 15' thereof. When the loops 31 are pressed with the fingers in the directions shown by the arrow H, the pin 8 will slide automatically away from the parallel rods 6, thus releasing the belt 7 (FIGURES 1 and 2) so that the length can be adjusted at the desired value.

As an alternative, FIGURES 19 and 20 illustrate a bar 8 comprising plungers 33 and 33' of square or rectangular cross-sectional contour (FIGURE 22 or 20) urged by a spring 34 and adapted to slide in a cavity 35 formed in the gripping knobs 12' (FIGURE 19) or 35" in the tightening pin 8 (FIGURE 21). These plungers have at their outer ends an inclined surface 36 or 35' coacting either with the lateral edge 14 (FIGURES 19, 1 and 2) of aperture 11 raised for example to this end, or with the lateral edge 14a of an aperture 11a formed in plates 3a lining the sides of mounting 3.

The pin 8 urged by said inclined surfaces 36 or 36' towards the rods 6 will continuously lock the tightening belt 7, except if a pressure is exerted against the gripping knobs 12 (FIGURE 21) or 33a (FIGURE 19) carried by the outer ends of plungers 33 and 33'.

It will be noted that in the specific forms of embodiment illustrated in FIGURES 17 and 18, protection lips 3b are secured to the mounting 3 to prevent the loops 31 (FIGURES 17 and 18) and plungers 33 and 33' (FIGURES 19 and 21) from pushed inadvertently.

What is claimed is:

1. A belt buckle for the adjustable wedging of a belt comprising a frame having a base and side walls with openings, fixed means mounted in said side walls forming an elongated slot having spaced edges extending parallel to the base of said frame through which a belt is passed through twice, so that independently of which one of the two belt sections extending from said elongated slot is pulled a double wedging of the belt on each of said edges is accomplished, a cross bar to be looped around by said belt slidably mounted in said openings of said side walls whereby said belt may be wedged tight at a tension between said cross bar and said edges, a pair of cooperating surfaces between said cross bar and said side walls, a handle for detaching said surfaces, one of said surfaces being coordinated with said cross bar and the other with said side walls, one of said surfaces having a resiliently urged oblique surface acting parallel to the axis of said cross bar against the other of said surfaces, so that a force results on said cross bar in the direction of said edges.

2. A belt buckle as set forth in claim 1 wherein said handle is fixed to said cross bar and extends laterally from said oblique frame, said oblique surface being provided on said handle to cooperate with one portion of said openings and said other surface being formed by another portion of said openings.

3. A belt buckle as set forth in claim 1, wherein a flat spring is provided having one end surrounding said cross bar and the other end forming an extension of said oblique surface.

4. A belt buckle as set forth in claim 1 wherein a flat spring is provided to wedge said belt at tension between said cross bar and said edges, one end of said spring being connected fixedly with said handle and other other end of said spring having an extension forming said oblique surface.

5. A belt buckle as set forth in claim 4 wherein said flat spring and said handle are integral.

6. A belt buckle as set forth in claim 1 wherein said handle has a resilient extension and the end of said extension forms said oblique surface.

7. A belt buckle as set forth in claim 1 wherein said handle is fixed to said cross bar and extends laterally beyond said frame and said handle is connected with said oblique surface and an extension is provided on said frame having said other surface.

8. A belt buckle as set forth in claim 1 wherein said handle is provided with a bore, a bolt is located in said bore and a spring located in said bore acts upon said bolt to urge said cross bar towards said edges.

9. A belt buckle as set forth in claim 8 wherein said bolt is provided with said oblique surface.

10. A belt buckle as set forth in claim 1 wherein said oblique surface is formed at the end of an arm pivoted on an axis in said side walls and said other surface is provided on said cross bar, a spring urging said arm towards said cross bar and an opening lever mounted on said axis to remove said oblique surface from said cross bar.

11. A belt buckle as set forth in claim 1 wherein said oblique surface is provided on a construction comprising two parallel slidable members on said cross bar, a spring located between said members urging said members outwardly from said cross bar and a push button is provided on said handle for loosening said cross bar.

12. A belt buckle as set forth in claim 1 wherein a bent flat spring exerts said tension, one end of said spring being connected to said cross bar and the other end forming said oblique surface, the bent portion of said spring extending towards the exterior to form said handle.

References Cited

UNITED STATES PATENTS

| | | | |
|---|---|---|---|
| 2,743,497 | 5/1956 | Davis | 24—196 |
| 2,938,254 | 5/1960 | Gaylord | 24—171 |
| 3,209,424 | 10/1965 | Cadiou | 24—196 |
| 1,131,550 | 3/1915 | Prentice | 24—74 |
| 3,121,272 | 2/1964 | Matthews et al. | 24—196 |

FOREIGN PATENTS

| | | |
|---|---|---|
| 1,072,643 | 3/1954 | France. |
| 12,112 | 1889 | Great Britain. |
| 976,680 | 12/1964 | Great Britain. |

DONALD A. GRIFFIN, Primary Examiner